US00RE44385E

(19) United States
(12) Reissued Patent
Johnson

(10) Patent Number: US RE44,385 E
(45) Date of Reissued Patent: Jul. 23, 2013

(54) METHOD OF MAKING IN-SITU COMPOSITES COMPRISING AMORPHOUS ALLOYS

(75) Inventor: William L. Johnson, Pasadena, CA (US)

(73) Assignee: Crucible Intellectual Property, LLC, Rancho Santa Margarita, CA (US)

(21) Appl. No.: 13/091,443

(22) Filed: Apr. 21, 2011

Related U.S. Patent Documents

Reissue of:
(64) Patent No.: 7,520,944
Issued: Apr. 21, 2009
Appl. No.: 10/545,123
PCT Filed: Feb. 11, 2004
PCT No.: PCT/US2004/004558
§ 371 (c)(1),
(2), (4) Date: Apr. 4, 2006
PCT Pub. No.: WO2005/005675
PCT Pub. Date: Jan. 20, 2005

(51) Int. Cl.
*C22C 45/00* (2006.01)
*C21D 9/00* (2006.01)

(52) U.S. Cl.
USPC ..... 148/403; 148/561

(58) Field of Classification Search
USPC ..... 148/561, 403
See application file for complete search history.

(56) References Cited

U.S. PATENT DOCUMENTS 2,106,145 A * 1/1938 Floraday ..... 362/490
2,124,538 A * 7/1938 Boyer ..... 75/10.65
2,190,611 A * 2/1940 Sembdner ..... 29/33 R
3,322,546 A * 5/1967 Tanzman et al. ..... 75/255
3,539,192 A * 11/1970 Prasse ..... 277/444
3,776,297 A * 12/1973 Williford et al. ..... 164/461

(Continued)

FOREIGN PATENT DOCUMENTS

DE 010237992 * 3/2003
DE 010237992 A1 3/2003

(Continued)

OTHER PUBLICATIONS

Koch et al., "Preparation of "Amorphous"$Ni_{60}Nb_{40}$ By Mechanical Alloying", Appl. Phys. Lett., Dec. 1983, vol. 43, No. 11, pp. 1017-1019.

(Continued)

*Primary Examiner* — Deborah Yee
(74) *Attorney, Agent, or Firm* — Pillsbury Winthrop Shaw Pittman LLP

(57) ABSTRACT

[A method of forming in-situ composites of metallic alloys comprising an amorphous phase are provided. The method generally comprising the steps of transforming a molten liquid metal at least partially into a crystalline solid solution by cooling the molten liquid metal down to temperatures below a "remelting" temperature, then allowing the solid crystalline metal to remain at temperatures above the glass transition temperature and below the remelting temperature such that at least a portion of the metal remelts to form a partially amorphous phase in an undercooled liquid, and finally subsequently cooling the composite alloy to temperatures below the glass transition temperature.] *A method of forming in-situ composites of alloys is provided. In one embodiment, forming in-situ composites may include first providing a quantity of an alloy at a temperature above a liquidus temperature of the alloy in a Continuous Cooling Transformation Diagram; and then cooling the alloy to a remelting region in the Continuous Cooling Transformation Diagram of the alloy; and further cooling the alloy to exist the remelting region in the Continuous Cooling Transformation Diagram of the alloy to form the in-situ composite. The alloy may include a binary, a ternary, a quaternary and/or higher order alloy systems.*

31 Claims, 2 Drawing Sheets

U.S. PATENT DOCUMENTS 3,948,613 A * 4/1976 Weill ..... 428/601
3,970,445 A * 7/1976 Gale et al. ..... 420/64
3,986,867 A * 10/1976 Masumoto et al. ..... 148/403
3,986,892 A * 10/1976 Ewe et al. ..... 429/218.1
4,024,902 A * 5/1977 Baum ..... 164/97
4,067,732 A * 1/1978 Ray ..... 148/403
4,099,961 A 7/1978 Patten
4,115,682 A 9/1978 Kavesh et al.
4,124,472 A 11/1978 Riegert
4,125,737 A 11/1978 Andersson
4,163,071 A 7/1979 Weatherly et al.
4,260,416 A 4/1981 Kavesh et al.
4,268,564 A 5/1981 Narasimhan
4,289,009 A 9/1981 Festag et al.
4,330,027 A 5/1982 Narasimhan
4,374,900 A 2/1983 Hara et al.
4,381,943 A 5/1983 Dickson et al.
4,396,820 A 8/1983 Puschner
4,409,296 A 10/1983 Ward
4,472,955 A 9/1984 Nakamura et al.
4,482,612 A 11/1984 Kuroki et al.
4,487,630 A 12/1984 Crook et al.
4,488,882 A 12/1984 Dausinger et al.
4,499,158 A 2/1985 Onuma et al.
4,515,870 A 5/1985 Bose et al.
4,523,625 A 6/1985 Ast
4,526,618 A 7/1985 Keshavan et al.
4,557,981 A 12/1985 Bergmann
4,564,396 A 1/1986 Johnson et al.
4,585,617 A 4/1986 Tenhover et al.
4,612,059 A 9/1986 Mori et al.
4,621,031 A 11/1986 Scruggs
4,656,099 A 4/1987 Sievers
4,668,310 A 5/1987 Kudo et al.
4,710,235 A 12/1987 Scruggs
4,725,512 A 2/1988 Scruggs
4,731,253 A 3/1988 DuBois
4,741,974 A 5/1988 Longo et al.
4,770,701 A 9/1988 Henderson et al.
4,810,850 A 3/1989 Tenkula et al.
4,854,370 A 8/1989 Nakamura
4,960,643 A 10/1990 Lemelson
4,990,198 A 2/1991 Masumoto et al.
5,032,196 A 7/1991 Masumoto et al.
5,053,084 A 10/1991 Masumoto et al.
5,053,085 A 10/1991 Masumoto et al.
5,074,935 A 12/1991 Masumoto et al.
5,117,894 A 6/1992 Katahira
5,127,969 A 7/1992 Sekhar
5,131,279 A 7/1992 Lang et al.
5,169,282 A 12/1992 Ueda et al.
5,189,252 A 2/1993 Huffman et al.
5,225,004 A 7/1993 O'Handley et al.
5,288,344 A 2/1994 Peker et al.
5,294,462 A 3/1994 Kaiser et al.
5,296,059 A 3/1994 Masumoto et al.
5,306,463 A 4/1994 Horimura
5,312,495 A 5/1994 Masumoto et al.
5,324,368 A 6/1994 Masumoto et al.
5,368,659 A 11/1994 Peker et al.
5,380,349 A 1/1995 Taniguchi et al.
5,390,724 A 2/1995 Yamauchi et al.
5,440,995 A 8/1995 Levitt
5,482,577 A 1/1996 Hashimoto et al.
5,567,251 A 10/1996 Peker et al.
5,567,532 A 10/1996 Peker et al.
5,589,012 A 12/1996 Hobby et al.
5,735,975 A 4/1998 Lin et al.
6,010,580 A 1/2000 Dandliker et al.
6,183,889 B1 2/2001 Koshiba et al.
6,218,029 B1 4/2001 Rickerby
6,325,868 B1 12/2001 Kim et al.
6,326,295 B1 12/2001 Figura
6,491,592 B2 12/2002 Cackett et al.
6,709,536 B1 * 3/2004 Kim et al. ..... 148/561
6,771,490 B2 8/2004 Peker et al.
6,843,496 B2 1/2005 Peker et al.
6,887,586 B2 5/2005 Peker et al.
7,090,733 B2 * 8/2006 Munir et al. ..... 148/561
2002/0036034 A1 3/2002 Xing et al.

FOREIGN PATENT DOCUMENTS

GB 2005302 4/1979
GB 2236325 A 4/1991
GB 2243617 * 11/1991
JP 55-14090 9/1981
JP 61238423 A 10/1986
JP 02001303218 A 10/2001
WO WO00/68469 A2 11/2000
WO WO03/040422 A1 5/2003

OTHER PUBLICATIONS

Masumoto, "Recent Progress in Amorphous Metallic Materials in Japan", Materials Science and Engineering, 1994, vol. A179/A180, pp. 8-16.

ASM Committee on Tooling Materials, "Superhard Tool Materials", Metals Handbook, Ninth Edition, vol. 3, Properties and Selection: Stainless Steels, Tool Materials and Special Purpose Metals, American Society for Metals, 1980, pp. 448-465, title page and copyright page.

Lyman et al., Metals Handbook, Forging and Casting, 8th ed., 1970, vol. 5, pp. 285-291 and 300-306.

Eshbach et al., "Section 12—Heat Transfer", Handbook of Engineering Fundamentals, 3d ed., 1975, pp. 1113-1119.

Inoue, et al., "Mg-Cu-Y Bulk Amorphous Alloys with High Tensile Strength Produced by a High-Pressure Die Casting Method", Materials Transactions, 1992, JIM, vol. 33, No. 10, pp. 937-945.

Inoue, et al., "Bulky La-AI-TM (TM=Transition Metal) Amorphous Alloys with High Tensile Strength Produced by a High-Pressure Die Casting Method", Materials Transactions, 1993, JIM, vol. 34, No. 4, pp. 351 to 358.

Kato et al., "Production of Bulk Amorphous $Mg_{85}Y_{10}Cu_5$ Alloy by Extrusion of Atomized Amorphous Powder", Materials Transactions, JIM, 1994, vol. 35, No. 2, pp. 125 to 129.

Kawamura et al., Full Strength Compacts by Extrusion of Glassy Metal Powder at the Supercooled Liquid State, Appl. Phys. Lett. 1995, vol. 67, No. 14, pp. 2008-2010.

Catalog Cover Entitled, Interbike Buyer Official Show Guide, 1995, 3 pages.

* cited by examiner $T_o(c)$
$T_g(c)$
ß
A
Composition
$A_mZ_n$ $T_l$
$T_{rm1}$
$T_{rm2}$
$T_g$
T
A
B
C
Beta-phase crystals
Remelted Liquid
0.01 s
1s
100s
Time (logarithmic)
Crystallization curve for ß solid solution
"Remelting" curve for crystalline ß solid solution
Crystallization curve for $A_mZ_n$ intermetallic

METHOD OF MAKING IN-SITU COMPOSITES COMPRISING AMORPHOUS ALLOYS

Matter enclosed in heavy brackets [ ] appears in the original patent but forms no part of this reissue specification; matter printed in italics indicates the additions made by reissue.

FIELD OF THE INVENTION

The present invention relates to a method of making in-situ composites of metallic alloys comprising an amorphous phase formed during cooling from the liquid state.

BACKGROUND OF THE INVENTION

Amorphous alloys (or vitreous alloys or vitrified alloys or non-crystalline alloys or metallic glass or glassy alloys) are generally processed by melt quenching metallic materials employing sufficiently fast cooling rates to avoid the crystallization of the materials' primary and inter-metallic phases. As such, the dimensions of articles formed from amorphous alloys are limited, and the processing conditions may not be favorable for a variety of applications.

There exist a number of U.S. Patents (U.S. Pat. Nos. 5,368,659; and 5,618,359 and 5,032,196) which deal with the development of alloy compositions in which the minimum cooling rate required to obtain a bulk glassy alloy sample is relatively low (typically 1-1000 K/s). Such alloys form bulk glass when cooled at rates above this minimum cooling rate. These alloys crystallize when cooled at rates less than this minimum rate. There is a direct relationship between this minimum cooling rate and the maximum thickness of a component which can be cast in the glassy state. The basic premise of this prior art is that the cooling rate of the alloy liquid must exceed a minimum rate to obtain bulk amorphous metal. It should also be noted that amorphous alloys formed by quenching from the liquid state are also generally called "metallic glass" in order to differentiate them form from amorphous alloys formed by other methods.

There are, in fact, other methods also utilized to form metallic amorphous phases. These processes use extended annealing times for atomic diffusion (W. L. Johnson, Progress in Materials Science, 1986 and U.S. Pat. No. 4,564,396) in the solid state (solid state amorphization), and/or extensive plastic deformation by mechanical milling of powders. These methods also involve the use of thin films or powders, in relatively small quantities. The powders, for example, have to be subsequently consolidated to obtain bulk material. As such, the commercial practice of these "solid state" methods is expensive and impractical.

One noteworthy method of "solid state amorphization" is described in U.S. Pat. No. 4,797,166, which outlines a method to form a partially amorphous phase in metallic alloys by "spontaneous vitrification," achieved by extended annealing of a crystalline alloy at temperatures below the glass transition temperature of the amorphous alloy. The initial crystalline alloy is stable at high temperatures, and is initially prepared by an annealing treatment at this elevated temperature. The first annealing treatment is followed by a "low temperature annealing" (below the glass transition of the product amorphous alloy). This method suffers from the requirement of very long thermal aging times below the glass transition to produce the amorphous phase from the parent crystalline phase. In addition, the fraction of amorphous phase in the final product is generally not uniform (with the amorphous phase forming preferentially in near surface areas of the sample). As such, this method has never been used commercially.

Accordingly, a need exists for an improved method of forming in-situ composites of metallic alloys comprising an amorphous phase without the use of high-rate quenching.

SUMMARY OF THE INVENTION

The current invention is directed to a novel method of forming in-situ composites of metallic alloys comprising an amorphous phase, comprising the steps of: transforming a molten liquid metal at least partially into a crystalline solid solution by cooling the molten liquid metal down to temperatures below a thermodynamic "remelting" temperature (liquidus temperature), then allowing the solid crystalline metal to remain at temperatures above the glass transition temperature and below the metastable remelting temperature such that at least a portion of the metal remelts to form a partially amorphous phase in an undercooled liquid, and finally subsequently cooling the composite alloy to temperatures below the glass transition temperature.

In one embodiment the composite is formed naturally during continuous cooling from the molten state.

In another embodiment the produced composite material has a continuous amorphous matrix phase with an embedded crystalline phase. In such an embodiment, the individual crystals are embedded in the amorphous matrix phase.

In still another embodiment the volume fraction of the amorphous phases may vary from as little as 5 vol. % up to 95 vol. %.

In yet another embodiment, the crystalline solid solution typically nucleates and grows to form solid dendrites which coarsen to consume the parent liquid. In such an embodiment, the composition of the crystalline primary phase is generally very close (within 10 at. %, and preferably 20 at. % of the initial liquid.). In one embodiment a substantial portion of these dendrites has been retained in the composite net of any "remelting".

In still yet another embodiment, the remelting occurs from boundaries between the original crystalline dendrites and proceeds to produce a liquid phase which envelops the dendrites to produce a continuous liquid matrix.

BRIEF DESCRIPTION OF THE DRAWINGS

These and other features and advantages of the present invention will become appreciated as the same becomes better understood with reference to the specification, claims and drawings wherein:

DESCRIPTION OF THE INVENTION

The current invention is directed to a novel method to form in-situ composites of metallic alloys comprising amorphous phase. The practice of the invention allows these composite structures to be formed during cooling from the liquid state. The invention can be applied to a wide variety of alloy systems, with common underlying characteristics as will be discussed below.

Generally, the method according to the current invention comprises the following general steps:

1) Providing a suitable initial alloy composition that forms a crystalline solid solution phase at elevated temperatures, just below the alloy liquidus temperature (the temperature above which the alloy is completely liquid in equilibrium), and heating a quantity of this alloy composition to a temperature above the alloy liquidus temperature to form a molten alloy.
2) Cooling the molten alloy from above the liquidus temperature, down to a temperature range below the liquidus temperature, where at least a portion of the molten alloy transforms to the crystalline solid solution phase. In this step, the composition of the forming crystalline solid solution should be very close to the initial alloy composition, or is substantially same as the initial alloy composition.
3) Continued cooling of the crystallized alloy down to a temperature range below a metastable "remelting" temperature, Trm, or "re-entrant melting temperature", where the "remelting" of at least a portion of the crystalline solid solution is achieved. In this step, the temperature range is selected to be sufficiently above the glass transition temperature of the alloy to allow the remelting to proceed rapidly to obtain a significant volume fraction of "remelted" undercooled liquid.
4) And finally, cooling the undercooled liquid down to temperatures below the glass transition temperature of the undercooled melt, in which the remelted undercooled liquid formed in step 3,—and any residual undercooled liquid left from the initial primary liquid—is frozen as an amorphous solid or metallic glass. The frozen solid alloy contains any remaining crystalline solid solution phase which was not remelted in step 3.

Figures 1A, 1B:
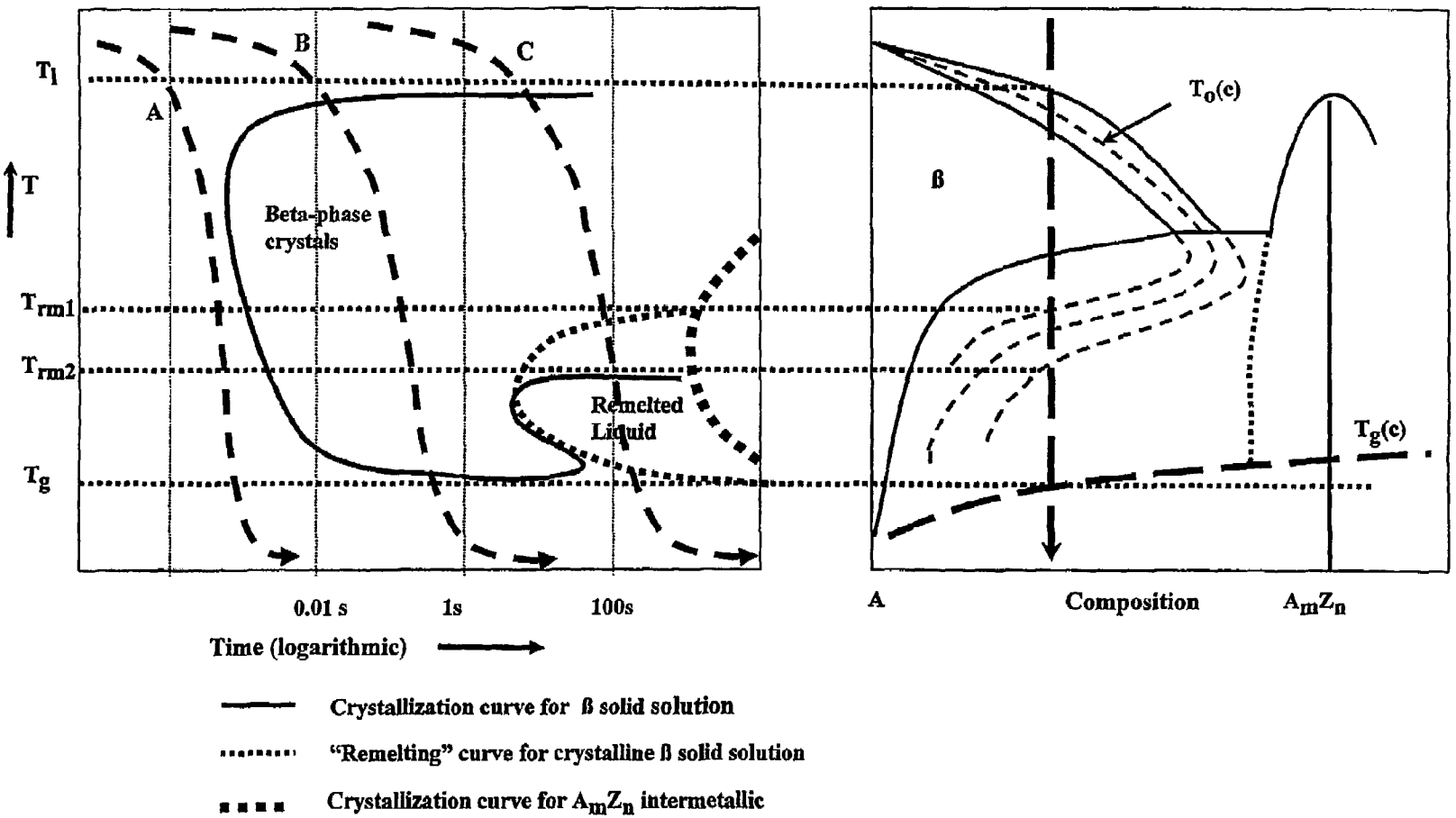
FIG. 1a is a graphical depiction of one embodiment of the method according to the current invention.
FIG. 1b is a graphical depiction of one embodiment of the method according to the current invention.

The general steps of the method are depicted graphically in FIGS. 1a and 1b. The diagram on the left hand-side (FIG. 1a) is called a CCT Diagram (or Continuous Cooling Transformation Diagram), where the transformations in the alloy are plotted in a time-temperature plot for continuous cooling. The diagram on the right-hand side (FIG. 1b) is a meta-stable phase diagram of the alloy system AZ.

In the figure, step 2 starts with the crossing of the cooling curve on the upper branch of the crystallization curve for the crystalline solid solution (referred to as the beta-phase in FIG. 1a). As the actual sample cooling curve (dashed trajectories in FIG. 1a) passes through the beta-crystal range, the sample freezes from a liquid to a crystalline solid consisting of a single beta-phase.

Step 3 starts with the crossing of the cooling curve below temperature $T_{rm1}$ and into the remelting region on the lower side of the CCT Diagram. The maximum fraction of remelted liquid obtained in step 3 depends on the temperature with respect to the relative location of metastable liquidus and solidus curves of the beta-crystalline phase in the accompanying phase diagram. For a complete remelting to occur, the temperature should be below $T_{rm2}$. The "remelting" temperatures should be above the glass transition temperature of the liquid alloy to allow the remelting to proceed sufficiently rapidly to obtain a significant volume fraction of remelted liquid. This fraction of amorphous phase will also depend on the rate at which the sample is cooled through the "remelting region". In fact, the more slowly the liquid is cooled through this region, the more remelted liquid phase will form, provided the nucleation and growth of intermetallic phases is avoided. This unexpected result will lead to an increasing volume fraction of amorphous phase in the final product as the cooling rate is lowered.

It should be noted that remelting occurs above the glass transition (of the liquid) and therefore produces a viscous liquid (not a solid glass) above the glass transition temperature. The remelting occurs relatively rapidly (on the time scale of the continuously cooling) so that the remelted liquid forms on a time scale short enough to allow the remelting process to progress extensively before the remelted liquid reaches the glass transition and freezes. The deeply undercooled liquid which forms by remelting is nevertheless quite viscous (compared with the high temperature liquid provided in step 1). As a result, chemical diffusion kinetics will be slow. Slow diffusion implies the liquid will be relatively stable with respect to nucleation of additional intermetallic phases such as the intermetallic compound depicted in FIG. 1b. Thus intermetallic crystalline phase formation is kinetically suppressed in the remelted liquid (as shown in FIG. 1b).

Figure 2:
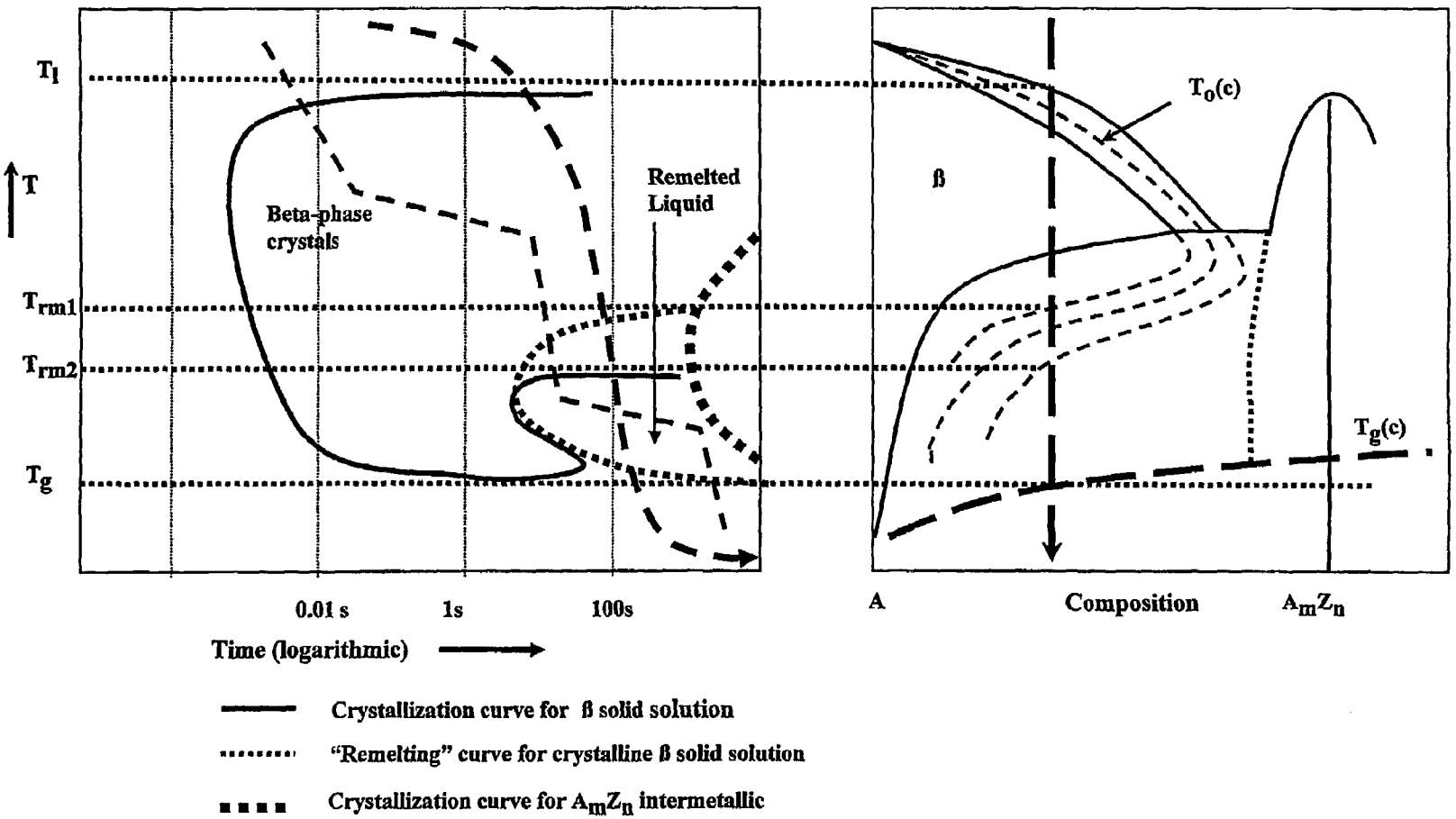
FIG. 2 is a graphical depiction of another embodiment of the method according to the current invention.

The cooling operation in steps 2, 3 and 4 can be either in one single-step monotonous cooling process, or as a ramp-down cooling profile as depicted in FIG. 2. In order to adjust the relative fraction of the crystalline phase versus amorphous phase, the cooling operation can be performed in a ramp-down manner. For example, for higher crystalline content, the cooling rate can be accelerated in the "remelting" region in step 3. Alternatively, the cooling rate can be slowed (or even the temperature can be stabilized in a range for a period of time) in step 3 to increase the content of the amorphous phase.

A special note is warranted for the definition of amorphous phase. Generally, X-ray diffraction, electron microscopy and calorimetric methods are employed to identify the amorphous phase. In the current invention, the re-melting may nucleate and grow in a variety of forms. In one form, the crystallized primary phase can be consumed into "remelted" liquid from the grain boundaries of the individual crystallites into the center of each crystallite. In another form, the crystallites may partially collapse into an amorphous structure of the undercooled liquid state by losing their long range order in one or two spatial directions. In this case, the conventional techniques may not be readily applicable even though the new structure loses its attributes as a crystalline structure, such as deformation mechanisms by dislocations in ordered structures. Herein, the definition of amorphous phase is extended to those cases where the crystalline primary phase partially collapses into an amorphous structure such that it can no longer deform by dislocation mechanisms.

Suitable alloy chemistry can be represented by the generic formula AxZy, wherein A is the primary element (or solvent element) and Z is the solute element. The alloy systems of interest are such that there is a significant size difference in atomic radii between the primary element and the solute element, such as more than 10% difference in atomic radii, and preferably more than 20% difference in atomic radii. Furthermore, these alloy systems of interest are such that they exhibit a primary crystalline phase with extended solid solution at elevated temperatures, i.e., much above the glass transition temperature and not far below the liquidus temperature. In addition, the primary phase has limited solubility at lower temperatures, around and below the glass transition temperature, so that the stability of the crystalline extended solid solution is limited to only elevated temperatures. There are potentially dozens to hundreds of such systems. It should also be understood that, the alloy systems of interest are not necessarily binary systems. The "A' in the above general formula can be a moiety for solvent elements, and "Z" can be a moiety for solute elements. Ternary, quaternary or higher order alloy systems can be preferably selected or designed in order to achieve various embodiments of the invention as described below. For example, additional alloying elements can be added in to the "A" moiety in order to stabilize and extend the solid olution of the primary phase at high temperatures.

The specific ranges of alloy compositions are selected with the aid of the $T_o$ curve, as shown in FIG. 1b. The $T_o$ temperature is the temperature at which the free energies of the liquid and primary crystalline phase, $G_1$ and $G_x$ are equal. The $T_o(c)$ curve is the locus of the $T_o$ temperatures as a function of composition c. The $T_o(c)$ curve must lie between the solidus and liquidus curves. Suitable alloy compositions are selected such that the alloy composition stays inside of the $T_o(c)$ curve. Alternatively, for an alloy composition AxZy, as described above, the value of "y" should be less than the maximum value of y(max) on the $T_o(c)$ curve, where y(max) corresponds to the nose of the $T_o(c)$ curve in the metastable phase diagram as depicted in FIG. 1b. Furthermore, the alloy composition should fall outside of the extended (metastable) liquidus curve of the competing intermetallic compound phases as depicted in FIG. 1b.

A feature of this method is that it allows the formation of a crystalline phase for subsequent "remelting" into an undercooled liquid. Another feature of this new method is the fact that an amorphous phase is formed at a cooling rate which is lower than the critical rate, yet greater than an extremely fast cooling rate. The cooling rate of the current method allows for the formation of "in-situ" composites comprising an amorphous phase at rates much lower than those required to form bulk amorphous metals by avoiding crystallization altogether. In turn, this allows for the production of bulk amorphous composites with very large (up to cms) thickness using a wide range of alloy systems previously thought to be unsuitable for forming amorphous phase bulk objects.

The current method can also appreciated in the following exemplary embodiment. As noted above, a greater fraction of amorphous phase will be formed as the cooling rate of the process is reduced in step 3. It should be noted that this observation is in stark contrast to all conventional metallic glass alloys formed by melt quenching. In these conventional quenching processes, greater cooling rates from the molten alloy result in higher fractions of metallic glass phase. For "conventional" or bulk-solidifying amorphous alloys, if the cooling rate from the melt is too low, no metallic glass phase is formed. The cooling rate must exceed a minimum value for the previous methods to form bulk amorphous alloys.

For example, in the alloy systems of interest to the present invention, the metallic glass phase could form at very high cooling rates (e.g., cooling trajectory A in FIG. 1a) by-passing the crystallization of primary phase (crystalline solid solution). For the present purposes, a very high cooling rate is taken to be greater than $10^4$ K/s. Alloys which require such high cooling rates are not considered bulk-solidifying amorphous alloys. At intermediate cooling rates (typically 100-$10^4$ K/s) no metallic glass phase is formed (e.g., trajectory B in FIG. 1a). Meanwhile, at very low cooling rates in the 0.1-100 K/s (e.g., trajectory C in FIG. 1a) the amorphous phase is formed by remelting according to the current invention. In such a process, a greater fraction of the alloy is formed having an amorphous phase as the cooling rate is lowered.

Finally, at extremely low cooling rates (e.g. less than 0.1 K/s, trajectory not shown), the remelted liquid may ultimately crystallize to an equilibrium intermetallic compound combined with the beta phase. The increase in the ability to form amorphous phase as the cooling rate decreases is the "hallmark" of the present method. In practice, it means that very large bulk specimens of "amorphous matrix composite" can be produced in a system where much higher cooling rates would be required produced the amorphous phase directly from the melt. The amorphous matrix composites formed using the present invention can thus be formed at unusually low cooling rates (0.1-10 K/s) with much greater sample thicknesses than even bulk-solidifying amorphous alloys. Thus, large samples can be directly cast for use in practical engineering applications.

The invention can be practiced in various exemplary embodiments as will be described below in order to achieve various desired microstuctures in the final composite.

In one embodiment the produced composite material has a continuous amorphous matrix phase with an embedded crystalline phase. The individual crystals are embedded in the amorphous matrix phase. The volume fraction of the amorphous phases may vary from as little as 5 vol. % up to 95 vol. %. In one embodiment the composite is formed naturally during continuous cooling from the molten state.

In another embodiment, the crystalline solid solution typically nucleates and grows to form solid dendrites which coarsen to consume the parent liquid. The degree to which the primary crystals have a dendritic morphology may vary. The composition of the crystalline primary phase is generally very close (within 10 at. % of major constituent elements) of the initial liquid. Thus the dendritic phase can grow without substantial changes in composition (compared with the starting liquid composition). In one embodiment a substantial portion of these dendrites has been retained in the composite net of any "remelting".

In yet another embodiment, the remelting occurs from boundaries between the original crystalline dendrites and proceeds to produce a liquid phase which envelops the dendrites to produce a continuous liquid matrix.

In still another embodiment, the initial liquid is transformed into fully into the crystalline solid solution and cooled down to ambient temperatures (cooling trajectory B in FIG. 1). Subsequently, the solid alloy is heated to temperatures above the glass transition temperature and below the remelting temperature to form at least partially amorphous phase by remelting the crystalline solid solution into undercooled liquid. The alloy with the formed microstructure is subsequently cooled to temperatures below glass transition and frozen.

While several forms of the present invention have been illustrated and described, it will be apparent to those of ordinary skill in the art that various modifications and improvements can be made without departing from the spirit and scope of the invention. Accordingly, it is not intended that the invention be limited, except as by the appended claims.

What is claimed is:

1. A method for forming an in-situ composite of a metallic alloy comprising the steps of:

providing an initial alloy composition that forms a crystalline solid solution phase at temperatures below the alloy's liquidus temperature, wherein the initial alloy has a composition represented by the generic formula AxZy, wherein A is the primary element, Z is the solute element, and x and y are percent quantities, and wherein size of the atomic radii of the primary element and the solute element are different by more than about 10%;

heating a quantity of the initial alloy composition to a temperature above the alloy's liquidus temperature to form a molten alloy;

cooling the molten alloy from above the liquidus temperature, down to a temperature range below the liquidus temperature such that at least a portion of the molten alloy transforms to the crystalline solid solution phase to form an at least partially crystallized alloy;

further cooling the at least partially crystallized alloy down to a remelting temperature range below a metastable remelting temperature and above the glass transition temperature of the alloy;

holding the alloy within the remelting temperature range sufficiently long to form a significant volume fraction of an undercooled liquid alloy from the at least partially crystallized alloy; and quenching the undercooled liquid alloy down to temperatures below the glass transition temperature of the alloy such that the material is frozen as a composite metallic glass alloy having at least a partial crystalline amorphous phase therein.

2. The method of claim 1, wherein the composite metallic glass alloy comprises a continuous amorphous matrix phase having the crystalline phase embedded therein.

3. The method of claim 2 wherein the individual crystals of the crystalline phase are embedded in the amorphous matrix phase.

4. The method of claim 2, wherein the volume fraction of the amorphous phase is between 5 vol. % an 95 vol. %.

5. The method of claim 1, wherein the crystalline solid solution at least partially nucleates and grows to form solid dendrites.

6. The method of claim 5, wherein the remelting step produces a liquid phase enveloping the dendrites to form a continuous liquid matrix.

7. The method of claim 1, wherein the molten alloy is transformed fully into the crystalline solid solution and cooled down to ambient temperatures to form a solid alloy, further comprising the steps of: heating the solid alloy to a temperature above the glass transition temperature and below the metastable remelting temperature to form an at least partially undercooled liquid amorphous phase by remelting the crystalline solid solution to form the undercooled liquid alloy; and quenching the undercooled liquid alloy to temperatures below the glass transition to form the composite metallic glass alloy having at least a partial amorphous phase therein.

8. The method of claim 1, wherein the composition of the crystalline solid solution phase is within 10 atomic % of the molten alloy.

9. The method of claim 1, wherein the composition of the crystalline solid solution phase is within 20 atomic % of the molten alloy.

10. The method of claim 1, wherein the size of the atomic radii of the primary element and the solute element are different by more than about 20%.

11. The method of claim 1, wherein the A represents a moiety for solvent elements, and the Z represents a moiety for solute elements.

12. The method of claim 1, wherein the temperature at which the free energies of the liquid and crystalline phase of the initial alloy are equal lies between the solidus and liquidus temperatures of the alloy.

13. The method of claim 1, wherein during the remelting, the alloy is cooled at a rate of between 0.1 and 100 K/s.

14. The method of claim 1, wherein during the remelting, the alloy is cooled at a rate of between 0.1 and 10 K/s.

15. An in-situ composite of a metallic alloy formed in accordance with the method described in claim 1.

16. An article formed from an in-situ composite of a metallic alloy formed in accordance with the method described in claim 1.

*17. A method for forming an in-situ composite, comprising:*

*1) transforming a molten liquid metal at least partially into a crystalline solid solution by cooling the molten liquid metal down to a temperature below a thermodynamic remelting temperature (liquidus temperature);*

*2) allowing the solid crystalline metal to remain at temperatures above the glass transition temperature and below the metastable remelting temperature such that at least a portion of the metal remelts to form a partially amorphous phase in an under-cooled temperature; and*

*3) finally subsequently cooling the composition alloy to temperatures below the glass transition temperature.*

*18. The method of claim 17, further comprising:*

*providing a quantity of a metallic alloy at a temperature above a liquidus temperature of the alloy in a Continuous Cooling Transformation Diagram;*

*cooling the alloy to a remelting region in the Continuous Cooling Transformation Diagram of the alloy; and*

*further cooling the alloy to exist at the remelting region in the Continuous Cooling Transformation Diagram of the alloy to form the in-situ composite;*

*wherein the alloy has a composition represented by the generic formula AxZy, wherein A is the primary element, Z is the solute element, and x and y are percent quantities, and wherein size of the atomic radii of the primary element and the solute element are different by more than about 10%.*

*19. The method of claim 18, further comprising heating the quantity of the alloy to the temperature above the liquidus temperature of the alloy.*

*20. The method of claim 18, further comprising cooling the alloy from above the liquidus temperature down to a temperature below the liquidus temperature, such that at least a portion of the alloy transforms to a crystalline solid solution phase to form an at least partially crystallized alloy.*

*21. The method of claim 20, wherein during the cooling the at least partially crystallized alloy melts to form a volume fraction of an undercooled liquid alloy at a temperature range below a metastable remelting temperature and above a glass transition temperature of the alloy.*

*22. The method of claim 18, wherein during the further cooling the undercooled alloy is cooled down to a temperature below a glass transition temperature of the alloy to form a composite metallic glass alloy having at least a partially crystalline amorphous phase therein.*

*23. The method of claim 18, wherein the alloy comprises a binary alloy system, a ternary alloy system, or both, wherein the primary element A comprises one or more alloying elements.*

*24. The method of claim 18, wherein the composite comprises a continuous amorphous matrix phase having a crystalline phase embedded therein.*

*25. The method of claim 20, wherein the alloy is transformed fully into the crystalline solid solution and cooled down to an ambient temperature to form a solid alloy, and the method further comprises:*

*heating the solid alloy to a temperature above a glass transition temperature and below a metastable remelting temperature to form an at least partially undercooled liquid amorphous phase by melting the crystalline solid solution to form the undercooled liquid alloy; and*

*cooling the undercooled liquid alloy to a temperature below the glass transition temperature to form the composite having at least a partial amorphous phase therein.*

*26. The method of claim 20, wherein the composition of the crystalline solid solution phase is within 20 atomic % of the alloy.*

*27. The method of claim 18, wherein the size of the atomic radii of the primary element and the solute element are different by more than about 20%.*

*28. The method of claim 18, wherein the temperature at which the free energies of the liquid and crystalline phase of the initial alloy are equal lies between the solidus and liquidus temperatures in the Continuous Cooling Transformation Diagram of the alloy.*

*29. The method of claim 18, wherein during the remelting, the alloy is cooled at a rate of between 0.1 and 100 K/s.*

*30. The method of claim 18, wherein the alloy has a $T_o(c)$ curve that falls between a solidus and liquid curves in the Continuous Cooling Transformation Diagram.*

*31. An in-situ composite of the alloy formed in accordance with the method described in claim 18.*

* * * * *